United States Patent [19]

Marchetti

[11] Patent Number: 5,716,664
[45] Date of Patent: Feb. 10, 1998

[54] METHOD OF MAKING A HYDROPHILIC, GRAPHITE ELECTRODE MEMBRANE ASSEMBLY

[76] Inventor: George A. Marchetti, 5726 S. Grand Ave., Western Springs, Ill. 60558

[21] Appl. No.: 667,521

[22] Filed: Jun. 19, 1996

Related U.S. Application Data

[63] Continuation of Ser. No. 586,626, Dec. 22, 1995.

[51] Int. Cl.$^6$ ................................................. H01M 4/88
[52] U.S. Cl. ................................. 427/115; 429/42
[58] Field of Search ........................... 429/30, 33, 40, 429/42, 44; 427/115; 502/101; 263/448

[56] References Cited

U.S. PATENT DOCUMENTS

| | | | |
|---|---|---|---|
| 4,044,193 | 8/1977 | Petrow et al. | 429/40 |
| 4,610,938 | 9/1986 | Appleby | 429/42 |
| 4,876,115 | 10/1989 | Raistrick | 427/115 |
| 5,211,984 | 5/1993 | Wilson | 427/115 |
| 5,234,777 | 8/1993 | Wilson | 429/33 |
| 5,272,017 | 12/1993 | Swathirajan et al. | 429/42 X |
| 5,547,911 | 8/1996 | Grot | 429/42 X |
| 5,561,000 | 10/1996 | Dirven et al. | 429/42 |
| 5,563,109 | 10/1996 | Risse | 429/42 X |
| 5,620,807 | 4/1997 | Mussell et al. | 429/42 X |

OTHER PUBLICATIONS

Ye, Siyu; Vijh, Ashok K., and Dao, Le H., A New Fuel Cell Electrocatalyst Based on Highly Porous Carbonized Polyacrylonitrile Foam with Very Low Platinum Loading, *J. Electrochem. Soc.*, vol. 143, No. 1, Jan., 1996; pp. L7–L9.

Uchida, Makoto; Aoyama, Yuko; Eda, Nobuo; and Ohta, Akira, New Preparation Method for Polymer–Electrolyte Fuel Cell, *J. Electrochem. Soc.*, vol. 142, No. 2, Feb., 1995, pp. 463–468.

Wilson, M.S., Springer, T.E., Zadowzinski, T.A., Gottesfoeld, S., *Recent Achievements in Polmer Electrolyte Fuel Cell (PEFC) Research at Los Alamos National Laboratory*, Jul. 30, 1991, LA–UR–91–1708, DE91 013683, Los Alamos National Laboratory, Los Alamos, New Mexico 87545.

*Primary Examiner*—Anthony Skapars
*Attorney, Agent, or Firm*—Janal M. Kalis

[57] ABSTRACT

The present invention includes a gas-permeable, hydrophilic, graphite fuel cell electrode for use in conjunction with an ionomer membrane. The fuel cell electrode includes a roughened, interstitial graphite surface enclosing micropores, upon which is deposited a catalyst for contacting an ionomer membrane. The graphite electrode has a thickness of about 40 microns.

6 Claims, 2 Drawing Sheets

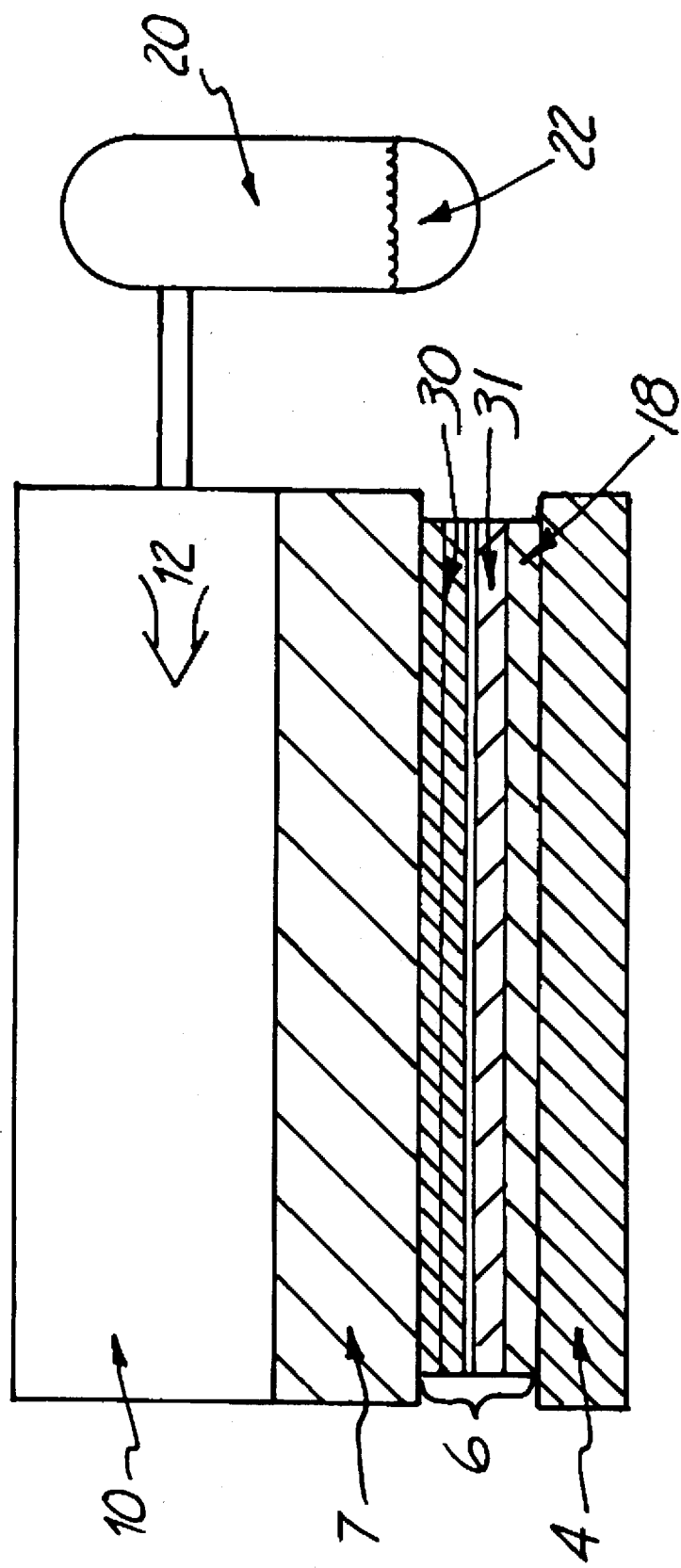

METHOD OF MAKING A HYDROPHILIC, GRAPHITE ELECTRODE MEMBRANE ASSEMBLY

This application is a Continuation-in-Part of copending application Ser. No. 08/586,626, filed Dec. 22, 1995.

FIELD OF THE INVENTION

The present invention relates to a fuel cell electrode and to a method for manufacturing the electrode. The electrode is designed to be utilized with an ionomer membrane in a fuel cell assembly.

BACKGROUND ART

Fuel cells are primary generators of electrical power. Fuel cells are similar to chemical batteries, such as lead or alkaline batteries, in that electricity is generated from a reaction of fuel and an oxidant. Unlike chemical batteries, however, the fuel and oxidant in a fuel cell are continuously resupplied. Thus, fuel cells never have to be electrically recharged. The cells require only a new supply of fuel and oxidant for continued operation.

A fuel cell includes two chambers, a first chamber for containing the fuel, usually hydrogen, and a second chamber for containing an oxidant, usually oxygen or an oxygen-rich gas such as air. The fuel and oxidant chambers sandwich two electrodes which, in turn, surround an electrolyte. Hydrogen molecules are adsorbed at one electrode, an anode, to break the hydrogen molecular bonds, creating hydrogen ions and free electrons. The electrons, as will be discussed, flow from the anode to a load device, such as a light bulb, and flow on to a second electrode, a cathode. Oxygen molecules are adsorbed at the cathode, and the hydrogen ions, migrating through the electrolyte, react with the oxygen molecules at the cathode in a reduction reaction to produce water. The adsorption of the hydrogen and oxygen molecules is stimulated by a catalyst layer serving as an interface between each of the two electrodes and the electrolyte. A potential difference existing between the hydrogen and oxygen electrodes, anode and cathode, respectively, thus creates an electrical current. Once the electrons reach the cathode, they are consumed by the reduction reaction.

Fuel cells which use an ionomer membrane as the electrolyte have a significant advantage over fuel cells which use a liquid electrolyte system. Liquid electrolyte systems, such as alkaline and phosphoric acid systems, require complex subsystems to assure the purity of the electrolyte, its continuous circulation and, most importantly, that a fixed three-phase boundary is maintained. The three-phase boundary is an interface at which the reactant gases, the electrode catalyst and the electrolyte meet. Unless precise controls are maintained, a liquid electrolyte can flood the three-phase boundary and thereby prevent the reactant gases from efficiently reaching the catalyst.

One type of ionomer membrane, e.g., a DuPont product known as Nafion®, eliminates a need for complex electrolyte subsystems and the precise controls otherwise necessary to maintain a fixed, three-phase boundary in a fuel cell. Nafion® is a proton exchange type of ionomer membrane. Acid groups, bonded within the membrane, facilitate the transit of protons from one side of the membrane to the other. Hydrogen ions are the typical species of proton which are transported using a proton exchange membrane. The transport of hydrogen ions within the membrane proceeds via a Grothius chain mechanism and, therefore, four to six water molecules are required for each hydrogen ion transported. If the ionomer membrane is not sufficiently hydrated, reduced hydrogen ion transfer will occur, and the fuel cell's performance will degrade. In extreme cases, dehydration of the membrane at elevated temperatures can lead to cracking of the membrane and loss of its ion-conducting capability.

Ionomer membranes have a second, potentially serious drawback. The membranes are comprised of essentially smooth, flat two-dimensional materials. The membranes, therefore, present an inherent impediment to extending a three-phase boundary into a third spatial dimension, which is unlike liquid electrolyte systems. In addition, ionomer membranes have a propensity to expand when wet. Consequently, it is difficult to attach a high-surface area electrode onto the ionomer membrane surface in order to extend the three-phase boundary. Thus, while ionomer membranes represent an advance over liquid electrolyte systems for fuel cell purposes, they present their own unique problems in designing a practical fuel cell assembly.

In order to deal with the dehydration problem, which is inherent to the use of an ionomer membrane, other fuel cell designers have chosen to use a hydrophobic electrode in conjunction with the membrane. A hydrophobic electrode will tend to retain water within the membrane and thereby reduce the overall loss of water from fuel cell assembly during operation. Hydrophobic fuel cell electrodes are typically composed of high surface area carbon particles, a graphite cloth backing layer and Teflon®. Teflon® particles, dispersed in an aqueous suspension, and the carbon particles are mixed. The mixture is applied to the graphite cloth backing layer. The electrode is then heated in order to sinter the Teflon® particles. The sintered Teflon® particles are hydrophobic and also serve to provide channels for the reactant gasses to reach the three-phase boundary. The electrical current produced at the catalyst layer flows via the carbon particles to the graphite cloth backing and then to a current collector. A typical hydrophobic electrode is the Prototech® electrode, manufactured by the E-Tech Company, also in Ohio.

Traditional fuel cell technology has relied upon hydrophobic electrodes based on a belief that hydrophobicity was necessary to prevent flooding of pores within the electrode, especially on the oxidant side of a fuel cell where product water is produced, and hence to maintain optimum contact between the three phases of the structure.

Unfortunately, hydrophobic electrodes also present significant water management problems. Indeed, water management has been a continuing and vexatious problem when hydrophobic electrodes are used in conjunction with a proton exchange membrane. In order to supply sufficient humidification for the membrane, water must be condensed onto the hydrogen-side, and sometimes, oxidant side electrode through the use of a separate complex subsystem. Moreover, because hydrophobic electrodes contain a significant amount of Teflon®, which is an electronic insulator, their electronic resistance can be high.

Three different approaches have been tried in order to address a three-phase boundary extension problem. A traditional approach, which has been used in ionomer membrane fuel cells to date, includes pressing relatively large quantities of platinum black into the membrane. By using this technique, the three-phase boundary can be extended into a third spatial dimension and higher power per unit area can be achieved. These high platinum loadings are very costly, however. Platinum catalyst loadings of 6 milligrams of platinum per square centimeter of fuel cell stack, i.e., including both the fuel and oxidant side of the cell are not uncommon. In order for ionomer membrane fuel cells to achieve commercial viability, the amount of costly, precious metal catalyst per unit area must be substantially reduced from those levels.

A second approach to extending the three-phase boundary of an ionomer membrane fuel cell has been to use a laser to create tiny cavities in the membrane itself. These cavities serve to make the membrane a three-dimensional surface and thereby increase its overall surface area. High platinum loadings appear to be required in this design as well, in order to take advantage of the increased surface area and to extend the three-phase boundary into the cavities.

A third approach has been to extend the three-boundary into the body of a pre-catalyzed, hydrophobic electrode by using liquid Nafion®. The liquid Nafion® flows into the body of the electrode, thereby extending the three-phase boundary. The electrode itself contains very small quantities of platinum catalyst. The low catalyst loading is possible because the electrode serves as an electronically conductive support for the catalyst. Unfortunately, because the electrode is hydrophobic, its performance suffers because of electronic resistance within the electrode and humidification difficulties.

Thus, state-of-the-art fuel cell electrodes, when used in conjunction with an ionomer membrane, have three principal deficiencies. First, the electrodes rely upon a pressure contact between carbon particles in a Teflon® binder for electrical conductivity. Even with a graphite cloth backing, there is significant electronic resistance within the electrode because of this type of binding reliance. Second, maintaining humidification of the membrane is difficult and requires an elaborate subsystem. Third, the most successful fuel cell designs to date, using an ionomer membrane, have required high levels of platinum catalyst loadings for effective operation.

SUMMARY OF THE INVENTION

The present invention includes a gas-permeable, hydrophilic, graphite fuel cell electrode for use in conjunction with an ionomer membrane. The fuel cell electrode includes a first graphite portion, terminating in a first surface for contacting fuel or oxidant. The electrode also includes a second graphite portion enclosing micropores, adjacent and integral to the first portion. The second portion terminates in a second pre-roughened surface, opposing the first surface, for contacting fuel or oxidant. The fuel cell electrode also includes a catalyst that is deposited onto the second pre-roughened surface to form a catalyzed graphite surface.

The present invention also includes a fuel cell assembly. The assembly includes a fuel side current collector, a fuel side electrode, an ionomer membrane contacting the fuel side electrode, an oxidant side electrode, and an oxidant side current collector. The oxidant side electrode is substantially identical to the fuel side electrode and opposes the fuel side electrode, also contacting the ionomer membrane.

The present invention further includes a method for making a hydrophilic fuel cell electrode with an interstitial surface and an ionomer membrane conformed to adhere to the interstitial surface. The method reforms the ionomer membrane from a flat material into a three dimensional material, thereby extending the three-phase boundary. The method includes hot-pressing a pre-roughened graphite main body to an ionomer membrane surface under pressure. The membrane is forced into shallow channels of the pre-roughened interstitial graphite surface, adhering to the surface and is molded into the surface.

The present invention further includes a method for making a hydrophilic, graphite fuel cell electrode. The method includes providing a graphite main body. The graphite main body is free of particles of Teflon® and carbon. The graphite has a density about one-half that of pure graphite. The graphite is roughened and thinned to a thickness of about 40 microns. The graphite main body has a first substantially smooth surface and an opposing second roughened surface enclosing micropores and mesopores.

BRIEF DESCRIPTION OF THE DRAWINGS

The invention may be better understood from the following detailed description when read with reference to the drawings in which:

FIG. 2 shows a schematic cross-sectional view of the layers of the electrode of the present invention.

DETAILED DESCRIPTION OF THE PREFERRED EMBODIMENTS

Figure 1:
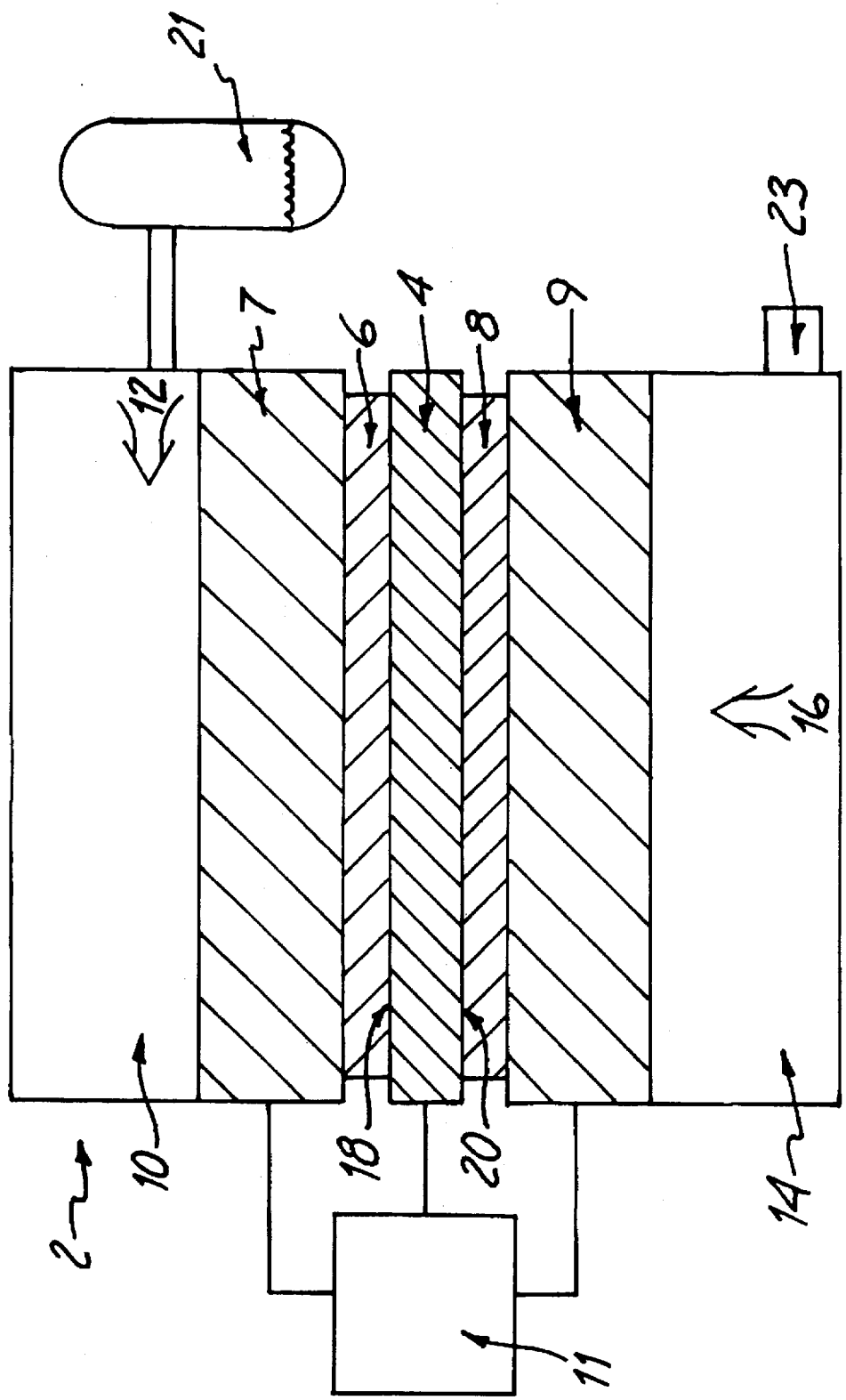
FIG. 1 shows a schematic cross-sectional view of the electrodes of the present invention installed in a hydrogen fuel cell.

The fuel cell electrode of the present invention includes a main body that is made entirely of graphite. The graphite has a density of about one-half that of pure graphite. The main body of the fuel cell electrode includes a first substantially smooth surface and an opposing roughened surface that encloses micropores and mesopores. The roughened surface of the graphite main body is roughened with an abrasive material, such as sandpaper, to increase its surface area. A catalyst is deposited upon the roughened surface to form a catalyzed graphite surface.

Each of two graphite electrodes is hot-pressed to an ionomer membrane at each of the roughened surfaces to form a bonded electrode/membrane assembly comprising the two electrodes and the ionomer membrane sandwiched between the two electrodes.

Once assembled, the bonded assembly is placed in a folded sheet of plastic and is pressed in a rotary press three or four times. The non-catalyzed portions of each of the graphite electrodes are stripped off by this pressing step, leaving only a thin layer of catalyzed graphite on either side of the ionomer membrane. Each of these thin layers serve as one of either the fuel or oxidant electrode, respectively.

Following this stripping process step, the graphite main bodies of the electrodes are approximately 40 microns thick. Micropores and mesopores enclosed in the roughened surface of each electrode permit the reactant gases and humidification to reach the catalyst layer and the ionomer layer.

Neither Teflon® nor carbon particles form any part of the fuel cell electrodes in the assembly of the present invention. In one embodiment, the graphite in the main body of each electrode is obtained from a graphite precursion material, manufactured by Johnson and Matthey, Product No. 10832. The graphite precursion material, as received, has a density which is one-half that of pure graphite and is 0.254 mm thick. The as-received material is neither gas-permeable nor appreciably hydrophilic.

In one embodiment, the graphite precursion material is roughened on one side using 320 grit, emery cloth sandpaper made by the 3M Company of Minneapolis, Minn. The graphite is hand-sanded in one direction 10 times. The graphite is then rotated 90° and sanded 5 times in the rotated direction. Waste from the sanding is removed from the graphite with a damp tissue. The purpose of the sanding is to create the roughened surface and thereby increase the available surface area for catalyst deposition. Sanding also permits the ionomer membrane to be pressed into shallow grooves created by the roughening step, thereby increasing the surface area of a three-phase boundary of the fuel cell assembly itself. In other roughening embodiment steps, the graphite surface may be roughened by any of a variety of other abrasives, by chemical or gas etching or other conventional mechanisms.

In one other sanding embodiment, the graphite precursion material is toughened on one side with a 320 grit, emery cloth sandpaper made by the 3M Company, ten times in one direction. The graphite precursion material is then rotated 90° and sanded five times with a 400 grit, emery cloth sandpaper. The graphite precursion material is rotated again 90° and sanded five times with a 400 grit, emery cloth sandpaper. The precursion material is once again rotated 90° and sanded three times with a 320 grit, emery cloth sandpaper.

The sanded graphite main body, which includes the roughened second surface and a smooth surface, is then ready for catalyst deposition. In one preferred embodiment, a thin layer of the platinum catalyst is sputtered onto the roughened surface, at a thickness equal to 200 to 300 nanometers on a smooth surface. It is contemplated that catalysts other than platinum, with equal or better capacities to catalyze the fuel oxidation reaction and/or the oxidant reduction reaction in the fuel cell may also be effectively used with the electrode of the present invention. The catalyst layer may be deposited by thermal deposition, vapor deposition, sputtering, electroplating or other conventional deposition method.

The ionomer membrane may be cleaned by any conventional method. Once the membrane is cleaned, the roughened, catalyzed second surface of the graphite is hot-pressed to the ionomer membrane. In one embodiment, two of the graphite main bodies which will eventually become the electrodes, are placed on either side of the ionomer membrane in a folded piece of parchment paper. The ionomer membrane should be air-dried for 24 hours prior to pressing. The graphite main bodies and membrane are pressed for 4 seconds and ironed two times with a hot iron. The parchment paper is flipped over and the graphite and membrane are again pressed for 4 seconds and ironed twice. The graphite main bodies are now tacked to the membrane. While maintaining the graphite main bodies and membrane in the parchment paper, the graphite main bodies and parchment are placed in a flat-plate vise that is preheated to a temperature of 260° to 275° F. The vise is tightened during a baking step. The graphite main bodies and membrane are baked for two and one-half minutes. Next, the vise is hammered tight and the graphite main bodies and membrane are baked for an additional two minutes and twenty seconds.

The graphite main bodies, membrane and parchment paper are removed from the vise and placed in a second piece of parchment paper to form an electrode assembly. The electrode assembly is passed through a rotary press. The graphite main bodies and membrane are removed from the parchment paper and allowed to cool for about five minutes.

The graphite main bodies and membrane are then placed in a slightly roughened, folded piece of plastic and passed through the rotary press three to four times. The piece of plastic used in one embodiment is a GBL Transparent Cover, manufactured by the Preston Company as Product No. 2001036. The graphite main body is thinned during this process by stripping off the smooth surface, leaving the catalyzed roughened surface unaltered, forming graphite main bodies only about 40 microns thick each, firmly bonded to the membrane.

By using this method, the ionomer membrane is transformed from a flat, two-dimensional material into an interstitial three-dimensional material and the three-phase boundary is extended into a third spatial dimension. The membrane is forced into the shallow grooves of the pre-roughened, catalyzed graphite electrode during the hot-press step and is molded into the electrode surface. The three-phase boundary is thereby extended into the pre-roughened surface of the electrode, in a manner which is unlike any prior approach. The hot-pressed electrodes adhere firmly to the membrane even when the electrodes and membrane are wet.

The electrodes thus made are thin, gas-permeable and hydrophilic with a relatively low resistance. It is contemplated that in mass production, the ionomer membrane could either be directly cast into the catalyzed graphite or hot-pressed.

In order to reduce electronic resistance still further, a gas-permeable current collector is used. Other fuel designs use a ribbed metal or graphite current collector. The reactant gases flow through the grooved channels to the electrode surface. A ribbed current collector cannot be used with the extremely thin, graphite electrodes of the present invention because the membrane and electrode assembly can be forced into the channels of the current collector, thereby preventing gas flow. To obviate this problem, sintered metal frits are used as current collectors in this invention. The principle materials requirement for the frit is that it not corrode or suffer a loss of electrical conductivity in the fuel cell environment. For example, frits made of or plated with nickel, titanium or gold may be used. In one embodiment, a bronze frit, manufactured by Permaflow, Inc. of Gardena, Calif. as Product No. F 100, is sputtered with a thin layer of gold. The gold side of the frit is in pressure contact with the graphite electrode.

Electricity is conducted from the current collectors to the load. In a fuel cell battery, the current collectors are separated by a thin, grooved separator plate. Reactant gases flow through the channels of the separator plate, into the sintered metal frit current collector, through the electrode and into the catalyst region.

The electrode itself permits excellent gas flow from the smooth surface of the electrode to the roughened surface via the micropores and mesopores in the processed material. It is contemplated that since sintered hydrophobic Teflon® is not used to create the gas channels, humified hydrogen gas may readily supply all of the moisture necessary to maintain hydration of the membrane, even at elevated internal fuel cell temperatures. For example, at an internal fuel cell temperature within a range of 130° to 140° F., no additional humidification is necessary. Product water, formed by the fuel cell reaction, appears to provide all the hydration needed within this temperature range. Additionally, the electronic resistance from the roughened surface of the electrode to the current collection points on the first surface is relatively low.

In one other process embodiment, the precursion graphite material is roughened, indented and/or punctured by the sandpaper grit. The graphite material is continuously thinned by the pressure applied by the rotary press. The pressing step is continued until the graphite has been reduced in thickness to approximately 125 microns and few, if any, visible holes remain, to form an electrode with a first side and a second side. The smooth surface of the electrode is then stripped off with tape. The electrode is pressed one final time with a Teflon® surface on an internal side of the electrode and sandpaper on an external side. It is contemplated that the electrode may be mass-produced by using high-speed, rotary presses with rollers that have been pre-roughened to simulate the effect of the sandpaper grit.

The processed graphite electrode is approximately 75 microns thick and is very flexible. The electrode resembles a piece of paper with respect to its thickness and flexibility. The electrode includes the smooth surface that is relatively smooth and permits gas flow through micropores created by the processing. The electrode also includes the roughened surface with micropores and mesopores in the graphite.

The electrode permits excellent gas flow from the roughened surface of the electrode to the smooth surface via the micropores and mesopores in the processed material. It has been found that since sintered hydrophobic Teflon® is not used to create the gas channels, humidified hydrogen gas readily supplies all of the moisture necessary to maintain hydration of the membrane, even at elevated internal fuel cell temperatures. Additionally, the internal electronic resistance of the graphite electrode of this process embodiment is extremely low, being approximately 0.2 ohms from the smooth surface of the electrode to the current collection points on the roughened surface of the electrode.

The present invention is a radical departure from prior attempts to create a fuel cell electrode which is compatible with an ionomer membrane. Instead of a hydrophobic electrode, the present invention includes a hydrophilic electrode, which allows continuous humidification of the membrane. Instead of trapping water within the membrane, as current state-of-the-art electrodes do, the hydrophilic fuel cell electrode allows humidification to be continually resupplied with the fuel and/or oxidant. The membrane is thereby continuously hydrated, and the intractable water management problem heretofore associated with ionomer membrane fuel cells is eliminated.

In addition, since the electrode is comprised entirely of graphite, the electrical conductivity of the electrode is very good. Furthermore, since the catalyst is deposited onto a roughened surface of the electrode, which forms a high-surface area, structural and electronic support, the amount of catalyst loading can be significantly reduced when compared to the high catalyst loading fuel cells discussed above.

The high catalyst loading fuel cells use unsupported platinum black to catalyze the reaction and to conduct the electric current generated. By using the graphite electrode of the present invention for catalyst support and for electronic conductivity, the catalyst loading can be reduced since the electrode, not the platinum, is chiefly relied upon for electrical conductivity.

The improved hydrophilic fuel cell electrodes according to the present invention are shown in a fuel cell 2 illustrated in FIG. 1. The fuel cell 2 is centered around an electrolyte matrix 4 which is an ionomer membrane. The, ionomer membrane 4 in the preferred embodiment is a solid polymer electrolyte manufactured by DuPont under the brand name Nafion® with a thickness of 0.175 mm. The membrane 4 is located between a pair of electrodes, anode 6 and cathode 8.

The Nafion® membrane is preferably cleaned by conventional methods prior to installation and use. In one embodiment, the membrane is cleaned with an aqueous solution of hydrogen peroxide, about 5 percent by weight, to remove organic impurities. The membrane is then soaked in a solution of 0.5 molar sulfuric acid to remove metal impurities and is rinsed in distilled water to remove remaining sulfuric acid. This method of cleaning is described in the J. Electro Analytical Chem. 251 No. 2, Sep. 23, 1988 at page 275.

A gas-permeable current collector is connected to anode 6 by a pressure contact. The current collector must be composed of a material which does not structurally deteriorate or lose electrical conductivity in the fuel cell environment. Materials such as stainless steel, titanium, nickel or graphite can be used. The current collector 7 is preferably a gas-permeable frit made of sintered material. A second gas-permeable, current collector 9 is connected to cathode 8. The fuel cell 2 is activated when current collectors 7 and 9 are connected to an electrical load 11 completing an electrical circuit. Electrical load 11 may be any electrical device, such as a light bulb or motor.

The anode 6 is placed between the ionomer membrane 4 and the gas or fuel manifold 10 which contains fuel 12. In this embodiment, the fuel 12 is hydrogen gas, at a pressure of one atmosphere. The interface between fuel manifold 10 and anode 6 allows the flow of fuel 12 to the anode 6. The cathode 8 is placed between the electrolyte matrix 4 and the oxidant manifold 14 through which oxidant 16 flows at a pressure of about 4 atmospheres. The interface between the oxidant manifold 14 and the cathode 8 allows the flow of oxidant 16 to cathode 8. In this embodiment, the oxidant 16 is compressed, breathable air. Surface 18 of anode 6 in contact with electrolyte membrane 4 contains a catalyst material. This material is typically a metal and, in the preferred embodiment, the catalyst is platinum. Similarly, surface 20 of the cathode 8 contacts electrolyte matrix 4 and also contains a platinum catalyst layer according to the preferred embodiment. The hydrogen gas may be humidified by passing it through a water chamber 21 before it enters the hydrogen manifold. Water in the water chamber can be heated with a high resistance electrical coil 22.

Hydrogen gas 12 from manifold 10 diffuses through anode 6 towards electrolyte membrane 4. As the hydrogen gas 12 is adsorbed by the catalyst 18, the bonds between the hydrogen molecules are broken by the oxidation reaction, producing hydrogen ions and free electrons. The hydrogen ions then diffuse through the electrolyte membrane 4 to interface 20 located proximate to cathode 8. The electrons preferentially flow from anode 6 to current collector 7 since electrolyte membrane 4 is an electronic insulator. The electrons thus flow towards cathode 8 by means of current collector 9, creating a current and generating a voltage to drive electric load 11. This voltage is equivalent to the potential difference between anode 6 and cathode 8. In the preferred embodiment, this potential difference is approximately 1 volt at open circuit. Voltage will vary with the current drawn through the load. Of course, this voltage may be increased to any desired voltage by putting multiple fuel cells in series. High-voltage fuel cell batteries can be fabricated in this manner using the invention as a principal component. The electrons move through current collector 9 and diffuse through cathode 8 where upon, arrival, they are recombined with the oxidant and the hydrogen ions. Simultaneously, oxidant 16 diffuses through cathode 8 and is adsorbed by the catalyst 20 to react with the hydrogen ions and arriving electrons in a reduction reaction to form water.

Electrodes 6 and 8 are similar. Anode 6, which is connected to current collector 7 according to the invention, is shown in FIG. 2. This figure is not drawn to scale in order to clearly illustrate surface 18, which is the catalyst interface to electrolyte membrane 4. The anode 6 is in direct physical contact with the fuel manifold 10 and is permeable to the flow of hydrogen gas 12 through current collector 7.

In one embodiment, each electrode forming either of the cathode and the anode 6 is composed of three distinct layers. The first layer of the electrode 30 which is adjacent to the hydrogen manifold 10 is composed of graphite with hundreds of micropores and mesopores per square inch to permit the flow of humidified hydrogen gas 12. The second layer of the electrode 31 is a pre-roughened surface and is composed of channels and a microporous graphite layer. The microporous graphite layer is deliberately made rough in order to increase the surface area available for catalyst deposition. It further has the beneficial effect of increasing the area of the three-phase boundary because the ionomer membrane is forced into the shallow channels of the second layer of electrode 31 by hot-pressing. The third layer is the catalyst layer 18.

The microporous graphite layer 31 allows the deposition of the catalyst layer 18 directly onto the solid surface anode 6. No other fuel cell design with an ionomer membrane allows direct deposition of all of the catalytic material directly onto the electrode from surface. Direct deposition should significantly reduce the cost of producing catalyzed fuel cell electrodes in mass production. Moreover, because the catalyst is supported by an electronically conductive material, i.e. graphite, a very thin layer of catalytic material is still capable of having good electrical conductivity via the supporting electrode. Since catalysis has long been recognized to be a surface phenomenon, reduction in the mass of catalyst is not detrimental to the electrochemical reaction as long as a high catalytic surface area is maintained. The present invention therefore results in relatively low catalyst loadings, without sacrificing either catalytic surface area or electronic conductivity.

The catalyst layer 18 can be deposited onto the anode 6 by thermal deposition, sputtering, electroplating or other methods known in the art. In one preferred embodiment, sputtering is the method employed. Although microporous graphite layer 31 forms a solid surface for the deposition of catalyst layer 18, the anode 6 still allows the hydrogen gas 12 at a pressure of about one atmosphere to reach and infiltrate the catalyst layer 18 through pores in graphite layers 30 and 31 and to humidify the electrolyte membrane 4 as needed. The anode 6 and cathode 8 are then hot-pressed to the electrolyte membrane 4 and pressed between the current collectors 7 and 9 to create a unified fuel cell assembly with catalyst layer 18 in direct physical contact with the electrolyte membrane 4. The hot-pressed anode 6, electrolyte membrane 4 and cathode 8 composite is about one-quarter millimeter thick and, together with the current collectors, is slightly more than three millimeters thick.

The microporous graphite layer 31 allows the deposition of the catalyst layer 18 directly onto the solid surface of anode 6. The anode 6 thereby forms a structural and electronic support for the catalyst layer 18. The catalyst layer 18 can be deposited onto the anode 6 by thermal deposition, electroplating, sputtering or other methods. Although microporous graphite layer 31 forms a solid surface for the deposition of catalyst layer 18, the anode 6 still allows the humidified hydrogen gas 12 at a pressure of about 1 atmosphere to reach and infiltrate the catalyst layer 18 through the pores in graphite layers 30 and 31 and continuously to humidify the electrolyte membrane 4. The anode 6 and cathode 8 are then hot-pressed to the electrolyte membrane 4 to create a unified fuel cell assembly with catalyst layer 18 in direct physical contact with the electrolyte membrane 4.

Cathode 8 is constructed in the same manner as anode 6. The oxidant 16, which is either oxygen or air, flows from the oxidant manifold 14 through the micropores and mesopores of the first graphite layer 30 and through the microporous second graphite layer 31 to catalyst 20. Again, catalyst 20 in the preferred embodiment is high surface area platinum. The oxidant 16 is at a pressure of approximately 4 atmospheres.

In operation, pressurized hydrogen 12 flows through the water chamber 21 and is humidified, as needed, depending upon the internal fuel cell temperature. The humidified hydrogen 12 then flows through the hydrogen manifold 10, the current collector 7 and the hydrophilic, gas-permeable anode 6 to the catalyst layer 18 where the oxidation reaction occurs. Pressurized air 16 flows through the oxidant manifold 14, the current collector 9 and the gas-permeable cathode 8 to catalyst layer 20 where the reduction reaction occurs. A slow bleed valve 23 in the oxidant manifold removes inert nitrogen and excess product water from the fuel cell. Nitrogen is present in the air 16, but does not take part in the reaction. Water is a product of the reaction. Some of the water is reabsorbed by the electrolyte membrane 4. The remainder is absorbed by the pressurized air 16 and removed from the fuel cell to the atmosphere via the slow bleed valve 23.

Thus, the present invention provides a fuel cell electrode which is thin, gas-permeable and hydrophilic, i.e., readily permits the passage of humidified gas or gases through the electrode and into the ionomer membrane. The invention provides a fuel cell electrode with relatively low electronic resistance from the front surface of the electrode to the current collection points on the back surface of the electrode. The present invention also provides fuel cell electrodes that can be a hot-pressed onto the ionomer membrane in order to create a unified electrode membrane assembly. The present invention also includes a fuel cell electrode with micropores and mesopores to permit gas flow but with few, if any, holes on the front surface, which would decrease the area available for catalyst deposition.

The present invention also includes a pre-roughened second surface onto which the catalyst is deposited, resulting in an increased surface area at the three-phase boundary and further allowing direct deposition of all of the catalyst on the front surface of the electrode.

The present invention also includes sintered metal frits as low-resistance electronic current collectors to facilitate the flow of the electrical current generated by the electrochemical fuel cell reaction to the load.

The aforementioned description is not to be interpreted to exclude other fuel cell arrangements advantageously employing the present invention. For example, other ionomer membranes, such as a proton exchange membrane produced by Dow Chemical Company may be utilized with equal or better effectiveness with the invention. Catalysts other than platinum very well also may be used. Furthermore, it is to be understood that the above-described fuel cell electrode is mainly an illustrative embodiment of the principles of this invention and numerous other arrangements and advantages may be devised by those skilled in the art without departing from the spirit and scope of the invention.

What is claimed is:

1. A method for making a hydrophilic, graphite electrode membrane assembly, comprising:
   providing a graphite main body wherein the graphite has a density about one-half that of pure graphite and wherein the graphite main body has a smooth surface and a roughened surface;
   applying a catalyst to the roughened surface to form a catalyzed graphite surface;

bonding the graphite main body to an ionomer membrane so that the toughened catalyzed graphite surface is in contact with the membrane to form an electrode; and stripping graphite from the graphite main body so that the remaining graphite main body is about 40 microns thick.

2. The method of claim 1 wherein the catalyst is platinum.

3. The method of claim 1 wherein the graphite is stripped from the graphite main body by treatment in a rotary press.

4. A method for reducing catalyst requirement in a fuel cell electrode by conforming a flat surface of an ionomer membrane component of the electrode to an interstitial surface of a graphite main body of the electrode, thereby increasing surface area of the membrane comprising:

providing a graphite main body wherein the graphite has a density about one-half that of pure graphite and wherein the graphite main body has a smooth surface and a roughened interstitial surface;

applying a catalyst to the roughened interstitial surface to form a catalyzed graphite surface;

hot-pressing and molding the ionomer membrane onto the roughened interstitial surface of the graphite;

bonding the graphite main body to the ionomer membrane so that the toughened catalyzed graphite surface is in contact with the membrane to form an electrode; and stripping away the majority of the graphite of the graphite main body so that the remaining graphite main body is about 40 microns thick.

5. The method of claim 4 wherein the catalyst is platinum.

6. The method of claim 4 wherein the graphite is stripped by treatment in a rotary press.

* * * * *

UNITED STATES PATENT AND TRADEMARK OFFICE
CERTIFICATE OF CORRECTION

PATENT NO. : 5,716,664
DATED : February 10, 1998
INVENTOR(S) : George A. Marchetti It is certified that error appears in the above-indentified patent and that said Letters Patent is hereby corrected as shown below:

Col. 5, line 11, delete the word "toughened" and insert the word --roughened--.

Col. 7, line 58, delete the words "The, ionomer" and insert the words --The ionomer--.

Col. 9, line 22, delete the word "from" and insert the word --front--.

Col. 11, line 2, delete the word "toughened" and insert the word --roughened--.

Col. 12, line 8, delete the word "toughened" and insert the word --roughened--.

Col. 3, line 13, delete the words "three-boundary" and insert the words --three-phase boundary--.

Col. 6, line 51, delete the word "humified" and insert the word --humidified--.

Signed and Sealed this

Ninth Day of June, 1998

Attest:

BRUCE LEHMAN

Attesting Officer

Commissioner of Patents and Trademarks